United States Patent

Daio et al.

(10) Patent No.: US 8,181,397 B2
(45) Date of Patent: May 22, 2012

(54) VEHICLE DOOR SASH MOLDING END RETENTION STRUCTURE

(75) Inventors: Masayuki Daio, Hiroshima (JP); Hakurei Watanabe, Saitama-ken (JP)

(73) Assignees: Nishikawa Rubber Co., Ltd., Hiroshima-Shi, Hiroshima (JP); Honda Giken Kogyo Kabushiki Kaisha, Minato-Ku, Tokyo (JP)

( * ) Notice: Subject to any disclaimer, the term of this patent is extended or adjusted under 35 U.S.C. 154(b) by 447 days.

(21) Appl. No.: 12/319,719

(22) Filed: Jan. 9, 2009

(65) Prior Publication Data

US 2009/0183435 A1      Jul. 23, 2009

(30) Foreign Application Priority Data

Jan. 22, 2008   (JP) ................................. 2008-011041

(51) Int. Cl.
*E06B 7/16*      (2006.01)
(52) U.S. Cl. ...................... 49/492.1; 49/490.1; 49/475.1
(58) Field of Classification Search ................. 49/475.1, 49/490.1, 492.1, 498.1
See application file for complete search history.

(56) References Cited

U.S. PATENT DOCUMENTS

| | | | | |
|---|---|---|---|---|
| 4,291,076 A | * | 9/1981 | Katoh ............................. 428/31 |
| 4,696,128 A | * | 9/1987 | Fukuhara ..................... 49/492.1 |
| 5,024,480 A | * | 6/1991 | Petrelli ....................... 296/146.9 |
| 5,207,029 A | * | 5/1993 | Nozaki et al. ................ 49/495.1 |
| 5,219,382 A | * | 6/1993 | Backes ........................... 49/440 |
| 5,347,758 A | * | 9/1994 | Yamane ........................ 49/484.1 |
| 5,489,104 A | * | 2/1996 | Wolff ............................. 277/646 |
| 5,651,218 A | * | 7/1997 | Bright et al. ................. 49/490.1 |
| 5,743,047 A | * | 4/1998 | Bonne et al. ................. 49/490.1 |
| 5,799,442 A | * | 9/1998 | Takahashi et al. .............. 49/377 |
| 6,409,251 B1 | * | 6/2002 | Kaye et al. ................. 296/146.9 |
| 6,668,490 B2 | * | 12/2003 | Hock et al. ....................... 49/502 |
| 6,679,003 B2 | * | 1/2004 | Nozaki et al. .................... 49/441 |
| 6,742,304 B1 | * | 6/2004 | Mueller et al. .................. 49/377 |
| 6,966,601 B2 | * | 11/2005 | Matsumoto et al. ........ 296/146.2 |
| 7,055,291 B2 | * | 6/2006 | Nakanishi et al. ............ 52/716.5 |
| 7,086,201 B2 | * | 8/2006 | Struyven et al. ................ 49/502 |
| 2006/0005471 A1 | * | 1/2006 | Yamada et al. .............. 49/490.1 |
| 2006/0207186 A1 | * | 9/2006 | Zwolinski et al. ........... 49/490.1 |

FOREIGN PATENT DOCUMENTS

| | | |
|---|---|---|
| JP | 62-001517 | 1/1987 |
| JP | 05-032154 | 2/1993 |
| JP | 2005-212219 | 8/2005 |
| JP | 2005-255031 | 9/2005 |

OTHER PUBLICATIONS

Japanese Office Action dated Feb. 9, 2010 for corresponding Japanese Application No. 2008-011041.
English translation of Japanese Office Action dated Feb. 9, 2010.

* cited by examiner

*Primary Examiner* — Katherine W Mitchell
*Assistant Examiner* — Justin Rephann
(74) *Attorney, Agent, or Firm* — Flynn, Thiel, Boutell & Tanis, P.C.

(57) ABSTRACT

A retention structure for retaining a sash molding end of a sash molding is provided. A weatherstrip and the sash molding are attached along a door sash. A hard material clip is insert-molded in the die-molded part at the end of the weatherstrip. The clip has a latch protruding from the die-molded part. An end cap die-molded at the sash molding end has an engaging part. The engaging part engages with the latch to retain the sash molding end.

7 Claims, 6 Drawing Sheets

FIG.1  [ Prior art ]
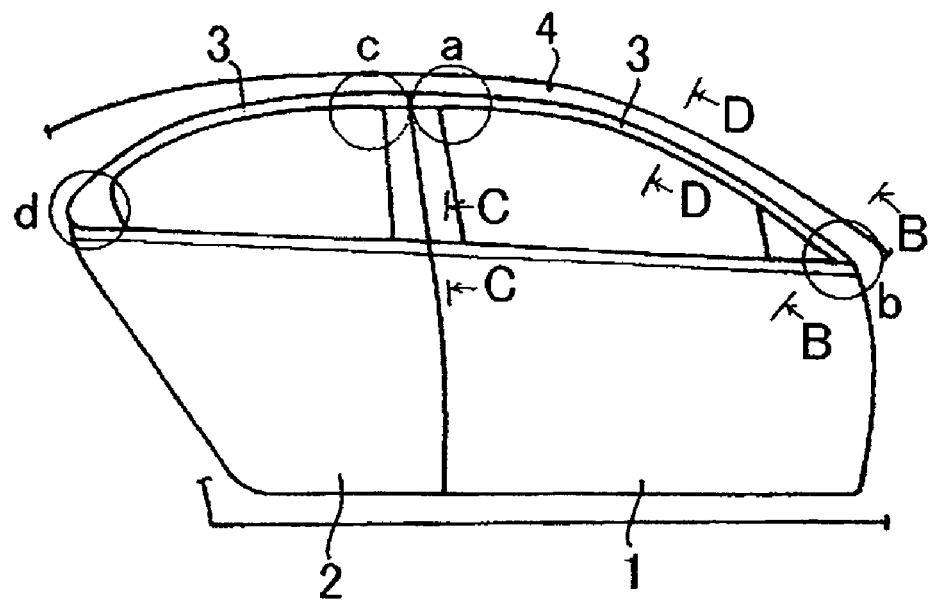
FIG.2  [ Prior art ]
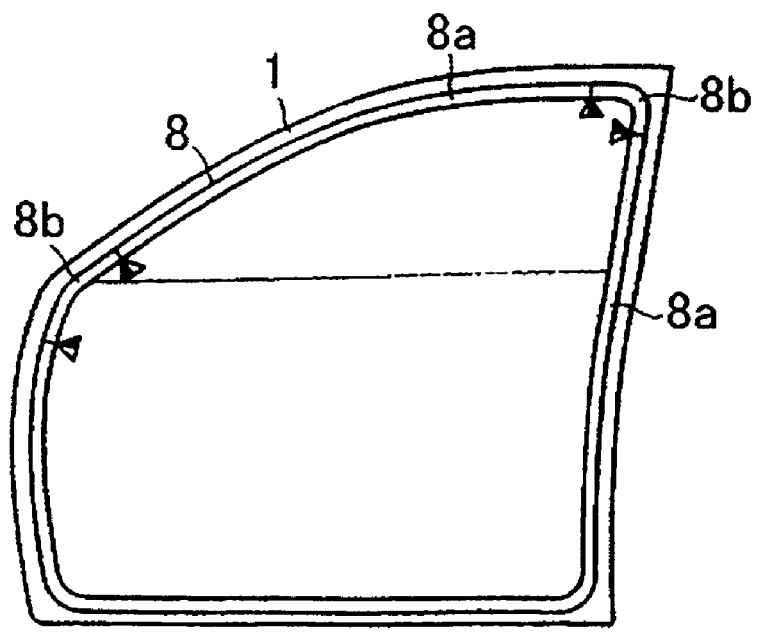

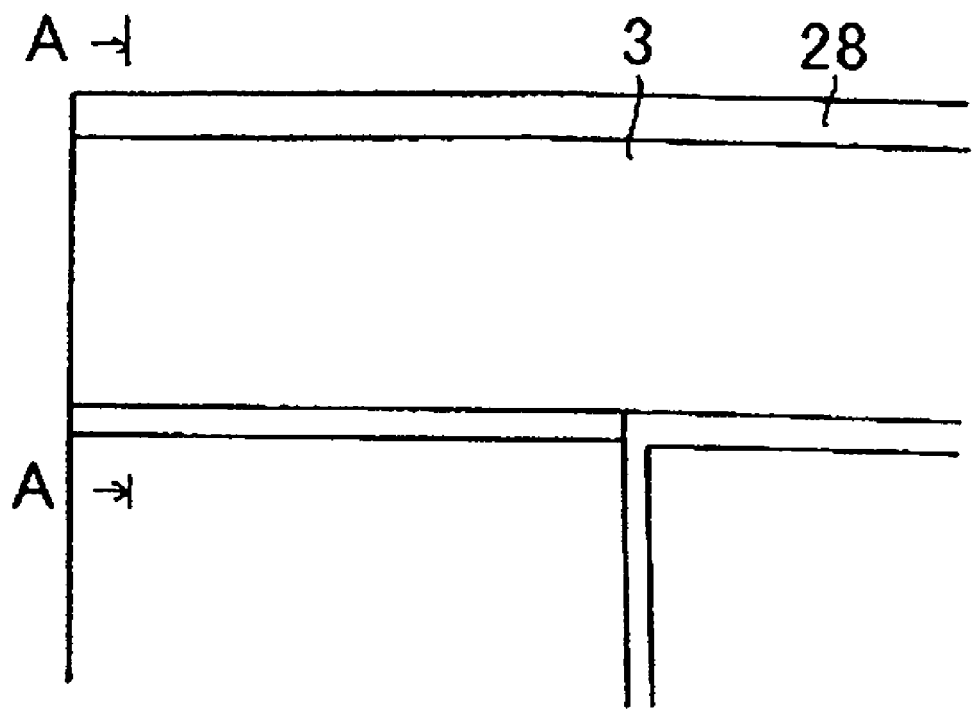
FIG.3 [Prior art]

FIG.4 [Prior art]
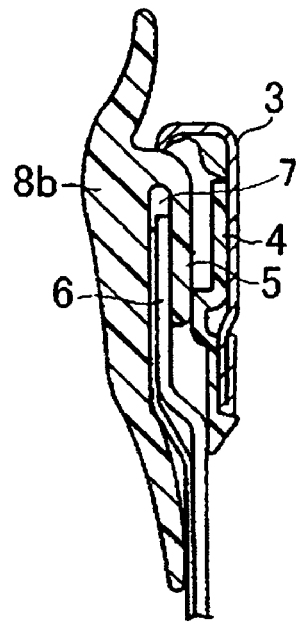
FIG.5 [Prior art]
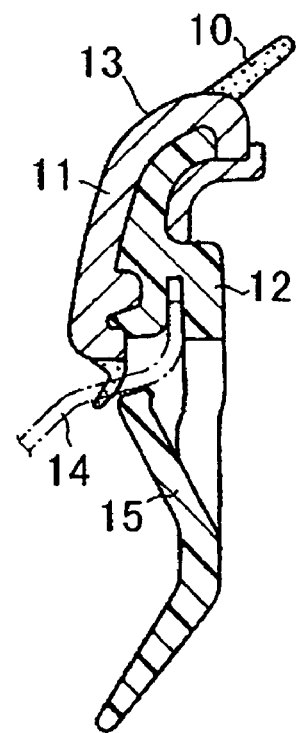

FIG.6 [ Prior art ]
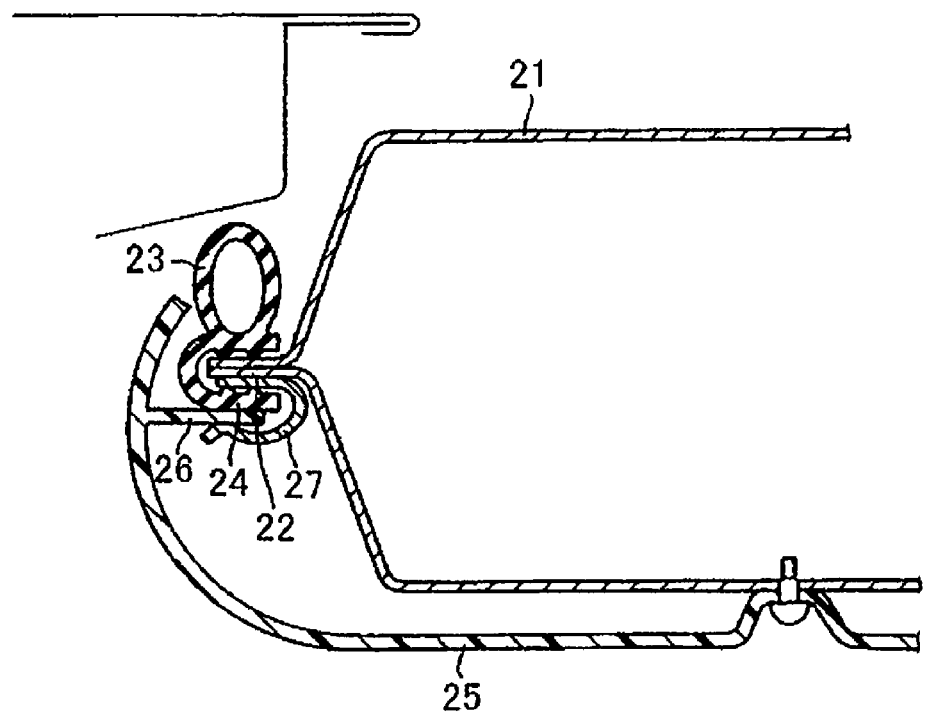
FIG.7
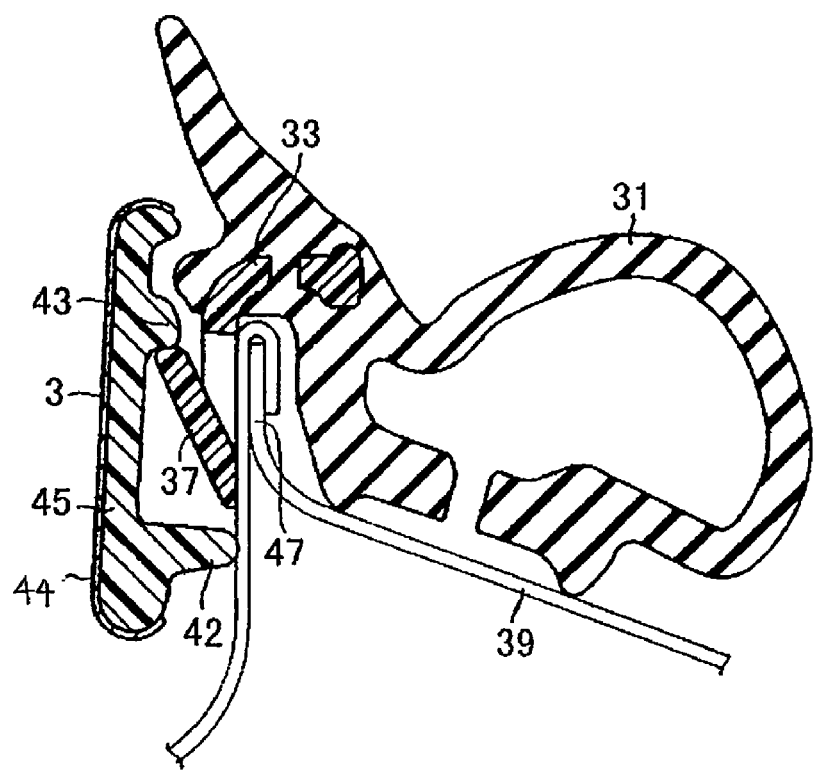

VEHICLE DOOR SASH MOLDING END RETENTION STRUCTURE

FIELD OF THE INVENTION

The present invention relates to a retention structure for retaining a sash molding end of a sash molding attached along a door sash of a vehicle door.

BACKGROUND OF THE INVENTION

The door sash of the vehicle door is provided with a weatherstrip made of a rubber-like elastic body for providing sealing between the door and a vehicle body 4 when the door is closed and a decorative resin sash molding 3 on the outer side of the door sash. In the case of a vehicle shown in FIG. 1, sash moldings 3 are attached to the outer side of the door sashes of a front door 1 and a rear door 2. As for the front door 1 shown in FIG. 2, the weatherstrip 8 providing sealing against the vehicle body 4 is attached around the door on the inner side.

The weatherstrip 8 consists of extrusion-molded parts 8a and die-molded parts 8b connecting the extrusion-molded parts 8a at the corners a and b in FIG. 1. In FIG. 2, the triangles are used to indicate that on the filled side thereof is a die-molded part 8b and on the non-filled side thereof is an extrusion-molded part 8a.

FIG. 3 is an enlarged view of the part a shown in FIG. 1. FIG. 4 is a cross-sectional view at the line A-A in FIG. 3. As described above, the sash molding 3 is attached to the door sash. However, the sash molding end is generally not retained because there is no door sash there. An end cap 4 is simply attached to the end of the sash molding 3 as shown in FIG. 4.

The die-molded part 8b provided at the end of a weatherstrip and located at the end of a sash molding 3 has a fin 5 forming an insertion groove 7 in which the flange 6 of the door sash is inserted. Then, the sash molding 3 is attached to the door sash from the outer side and the fin 5 is held by the end cap 4 at the sash molding end, whereby the die-molded part 8b is retained by the flange 6.

The Japanese Laid-Open Patent Application Publication No. 2005-212219 relates to a retention structure for the belt molding end in a cross-section at the line C-C in FIG. 1 wherein, as shown in FIG. 5, a belt molding 11 having a sealing lip 10 that makes elastic contact with the window pane and an end cap 12 are set on a die and coupled by injecting a polymer material to produce a molded product assembly 13, the end cap 12 of the molded product assembly 13 is fitted on an outer door panel 14, and an engaging piece 15 integral-formed with the end cap 12 is engaged with the outer door panel 14 for retention.

The Japanese Laid-Open Utility Model Application Publication No. H05-32154 relates to a structure for mounting a dash side trim below the front pillar of a vehicle wherein, as shown in FIG. 6, one side wall of a U-shaped cross-section base 24 of a weatherstrip 23 fitted on the flange 22 of a front pillar 21 and a rib 26 formed on the side edge of a dash side trim 25 are coupled by a clip 27 so that the side edge of the dash side trim 25 is attached to the front pillars 21.

In the prior art structure shown in FIGS. 3 and 4, the die-molded weatherstrip fin 5 is not rigid and therefore it is difficult to fit the fin 5 on the flange 6. Then, poorly retained on the flange 6, the fin 5 can easily come off when the sash molding 3 is pulled. Once it comes off, it is difficult to put the fin 5 back on. Furthermore, it is difficult for rubber or resin material injected in a die during the die-molding to reach the corners of a cavity forming a thin fin 5. Then, problems occur that the fin 5 may have dents due to insufficient spread of the material or welded gas marks or the fin 5 may easily break during the release from the die.

The retention structure shown in FIG. 5 is a belt molding end retention structure, which is not a sash molding end retention structure. In this structure, a clip 12 is fixed to the belt molding end by injection molding. When assembled to a door panel, there is a door panel corresponding to the clip 12 and the clip 12 is directly attached to the door panel.

The retention structure shown in FIG. 6 is a dash side trim retention structure in which the side edge of the dash side trim 25 is attached to the flange 22 of the front pillar 21 together with the weatherstrip 23 in the manner that the weatherstrip 23 is first attached to the flange 22 together with the clip 27, then the rib 26 of the dash side trim 25 is inserted in the clip 27. The dash side trim 25 cannot be attached before the weatherstrip 23 is attached.

SUMMARY OF THE INVENTION

The purpose of the present invention is to retain the sash molding end, which is not retained to the door in the prior art, to the door and retain the sash molding end in no particular order, either before or after the weatherstrip is attached, thereby facilitating the retention of the sash molding end.

In order to achieve the above purpose, in the sash molding end retention structure of the present invention, the weatherstrip that is attached to the vehicle door for sealing between the door and body when the door is closed has a hard material clip insert-molded at the position corresponding to the sash molding end and the clip has a latch protruding laterally from the weatherstrip. The sash molding that is attached along the upper edge of the vehicle door has an end cap die-molded at the end. The end cap has an engaging part that engages with the latch.

Other aspects and advantages of the present invention will became apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a side view of the core part of a vehicle;

FIG. 2 is a schematic view of the weatherstrip attached around the door on the inner side;

FIG. 3 is an enlarged view of the prior art sash molding end at the part a in FIG. 1;

FIG. 4 is a cross-sectional view at the line A-A in FIG. 3;

FIG. 5 is a cross-sectional view at the line C-C in FIG. 1 showing the prior art belt molding end retention structure;

FIG. 6 is a cross-sectional view showing the prior art dash side trim mounting structure;

FIG. 7 is a cross-sectional view of the retention structure of the present invention at the line B-B in FIG. 1;

DETAILED DESCRIPTION OF THE PREFERRED EMBODIMENT

FIG. 7 is a cross-sectional view at the line B-B near the front end b of the beltline of the front door 1 shown in FIG. 1.

Figure 8:
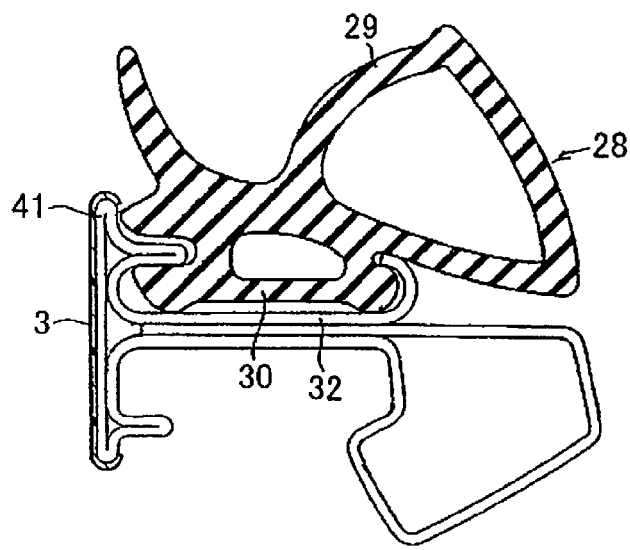
FIG. 8 is a cross-sectional view at the line D-D in FIG. 1.

FIG. 8 is a cross-sectional view at the line. D-D in FIG. 1. Both an extrusion-molded part 29 and a die-molded part 31 of a weatherstrip 28 are made of a rubber or rubber-like elastic body such as thermoplastic elastomer. The extrusion-molded part 29 is attached by fitting its base 30 in a door sash 32. The door sash 32 has a flange 41 to the outer side of which a sash molding 3 is attached.

Figure 9:
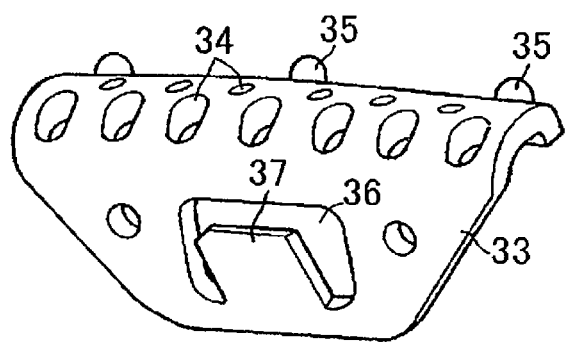
FIG. 9 is a perspective view of the clip.

The die-molded part 31 has a large rigid clip 33 that is insert-molded at a position corresponding to the sash molding end 44 and made of hard material having hardness higher than the sash molding 3 such as resin including polypropylene, polyethylene, and polyamide and metals including steel, stainless, and aluminum. As shown in FIG. 9, the clip 33 has a nearly J-shaped cross-section and a number of holes 34 which are filled with the molding material and projections 35 for increased combination to the die-molded part 31. The clip 33 protruding downward from the die-molded part 31 has a window 36 and a latch 37 protruding obliquely upward and outward from the lower edge of the window 36.

Figure 11:
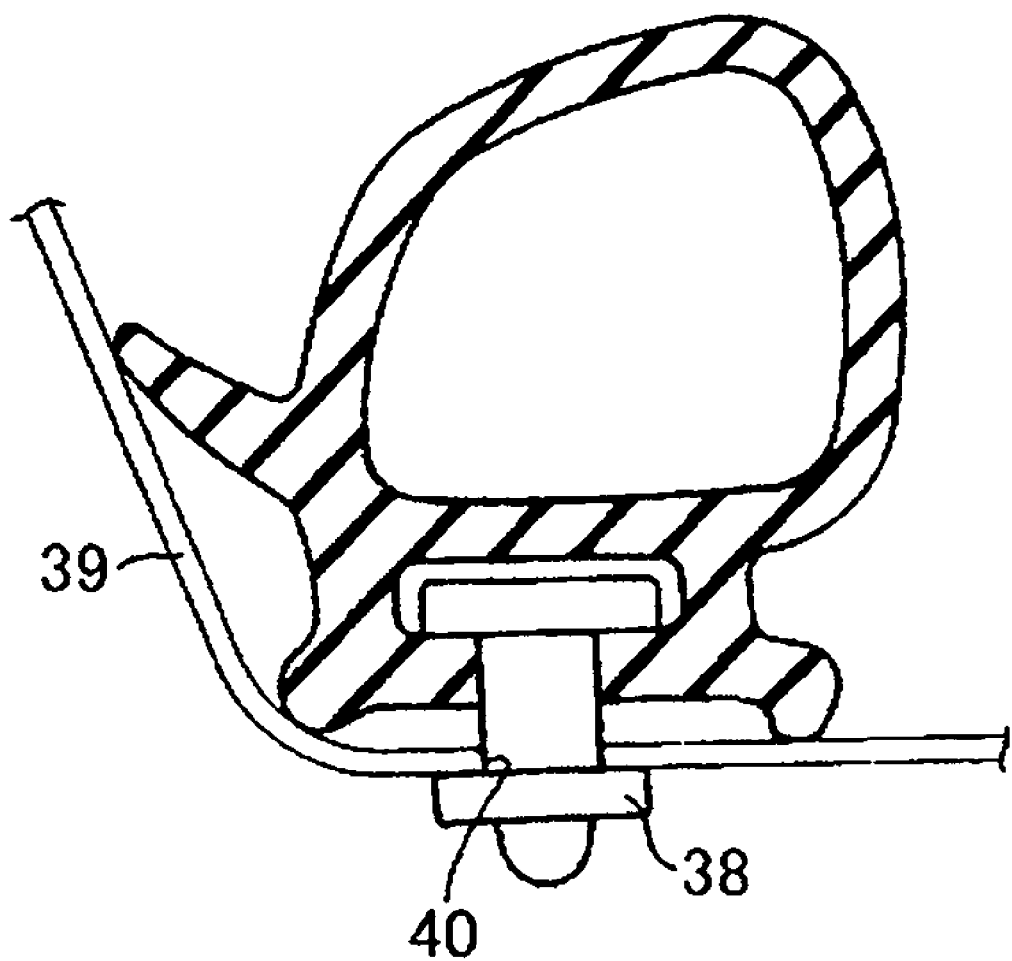
FIG. 11 is a cross-sectional view of the weatherstrip attached below the beltline

The weatherstrip 28 that is attached below the beltline is extrusion-molded and fixed using nearly cylindrical fasteners 38 formed separately at regular intervals in the longitudinal direction and inserted in holes 40 formed in the door panel 39 as shown in FIG. 11.

Figure 10:
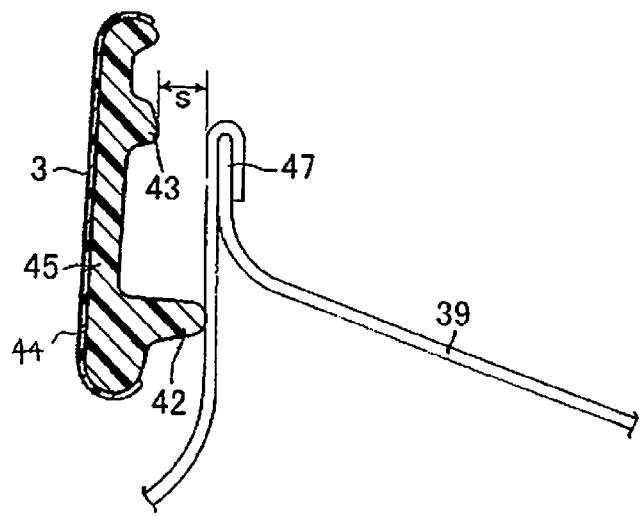
FIG. 10 is a cross-sectional view of the sash molding attached before the weatherstrip is attached.

The decorative sash molding 3 that is attached along the door sash 32 has at the end 44 an end cap 45 die-molded using the same hard material as the clip 33. As shown in FIG. 10, the end cap 45 has at the lower part a positioning protrusion 42 laterally protruding and abutting against the flange 47 of the door panel 39 for positioning the sash molding end 44. The end cap 45 also has an engaging part 43 above the positioning protrusion 42 with a distance to which the latch 37 vertically fits. With the positioning protrusion 42 abutting against the flange 47, a space s narrower than the lateral protrusion of the latch 37 is created between the engaging part 43 and flange 47.

The door sash 32 is not provided along the entire length of the sash molding 3 because of the door structure. There is no door sash 32 at the corner end of the door 1. The retention of the sash molding end where there is no door sash 32 is achieved by:

attaching the base 30 of the extrusion-molded part 29 of the weatherstrip 28 along the door sash 32, attaching the sash molding 3 to the flange 41 of the door sash 32, pressing the positioning protrusion 42 of the end cap 45 pushed in the sash molding end against the flange 47 of the door panel 39, and pressing the engaging part 43 against the latch 37 of the clip 33 protruding from the die-molded part 31 across the flange 47 from above for engagement, or reversely, by first attaching the sash molding 3 to the door sash 32, attaching the weatherstrip 28, and pushing the latch 37 of the clip protruding from the die-molded part 31 along the flange 47 of the door panel 39 for forced insertion into the space s between the flange 47 and engaging part 43.

Upon the above forced insertion, the latch 37 is squeezed in or the sash molding end 44 is pushed outward. After the latch 37 passes the engaging part 43, either the latch 37 or the sash molding end 44 restores and the latch 37 engages with the engaging part 43 of the end cap 45. A snapping sound or feeling can be obtained upon the forced insertion, whereby it can easily be confirmed that the latch 37 engages with the engaging part 43. The clip 33 is made of hard material and the latch 37 is highly rigid and easy to insert. The latch 37 can be wider without any problem with the insertion. A wider latch 37 leads to a larger engaging length with the engaging part 43, ensuring the retention.

As described above, the sash molding end and the die-molded part 31 of the weatherstrip 28 can be fastened at the same time where there is no door sash 32.

The above embodiment relates to the sash molding end retention structure at the front end b of the beltline of the front door 1 of a vehicle shown in FIG. 1. However, the sash molding end 44 at the door pillar top end a of the front door 1 and at the door pillar top end c and rear end d of the rear door 2 can be retained using the same structure as described above.

The present embodiments are to be considered as illustrative and not restrictive, and the invention is not to be limited to the details given herein, but may be modified within the scope and equivalence of the appended claims.

What is claimed is:

1. A sash molding end retention structure for a vehicle door having a door panel below a beltline of the door and a door sash located above the beltline of the door, the sash molding end retention structure comprising:
   a sash molding attached along a flange of the door sash which constitutes an upper edge of the door, the sash molding being longer in a longitudinal direction than the door sash;
   a weatherstrip for providing sealing between the door and a body of a vehicle when the door is closed, the weatherstrip being assembled to an outer rim of the door and attached to the door sash;
   an end cap attached to an end part of the sash molding where the door sash does not reach, the end cap being a separate member from the door sash and being made of material harder than the sash molding, the end cap including a positioning protrusion for positioning the end part of the sash molding, the protrusion abutting against a flange of the door panel and being formed on the end cap below the engaging part of the end cap at a distance; and
   a clip including a latch which protrudes laterally from the clip, the clip being made of material harder than the sash molding, the clip being molded into the weatherstrip at a position corresponding to the end part of the sash molding where the end cap is attached, the latch engaging with an engaging part of the end cap,
   wherein space is formed between the engaging part of the end cap and the flange of the door panel and the latch protruding obliquely upward is formed in the space.

2. The sash molding end retention structure according to claim 1, wherein the positioning protrusion protrudes from an outside of the flange of the door panel and an end part of the positioning protrusion abuts against the door panel.

3. The sash molding end retention structure according to claim 1, wherein the clip has a J-shaped cross-section.

4. The sash molding end retention structure according to claim 1, wherein the clip includes projections for combining the clip to the weatherstrip and a plurality of holes filled with molding material.

5. The sash molding end retention structure according to claim 1 further comprising fasteners for fixing the weatherstrip to the door panel, the fasteners being formed at regular intervals in the longitudinal direction and inserted through holes on the door panel.

6. A sash molding end retention structure for a vehicle door having a door panel below a beltline of the door and a door sash located above the beltline of the door, the sash molding end retention structure comprising:
   a sash molding attached along a flange of the door sash which constitutes an upper edge of the door, the sash molding being longer in a longitudinal direction than the door sash;

a weatherstrip for providing sealing between the door and a body of a vehicle when the door is closed, the weatherstrip being assembled to an outer rim of the door and attached to the door sash;

an end cap attached to an end part of the sash molding where the door sash does not reach, the end cap being a separate member from the door sash and being made of material harder than the sash molding, the end cap including a positioning protrusion for positioning the end part of the sash molding, the protrusion abutting against a flange of the door panel and being formed on the end cap below the engaging part of the end cap at a distance; and a clip including a latch which protrudes laterally from the clip, the clip being made of material harder than the sash molding, the clip being molded into the weatherstrip at a position corresponding to the end part of the sash molding where the end cap is attached, the latch engaging with an engaging part of the end cap, wherein the end part of the sash molding is either located near a front end of a front beltline of a front door where the sash molding of the front door and the front beltline intersect each other, or located near a rear end of a rear beltline of a rear door where the sash molding of the rear door and the rear beltline intersect each other, and space is formed between the engaging part of the end cap and the flange of the door panel and the latch protruding obliquely upward is formed in the space.

7. The sash molding end retention structure according to claim 6, wherein the positioning protrusion protrudes from an outside of the flange of the door panel and an end part of the positioning protrusion abuts against the door panel.

\* \* \* \* \*